United States Patent
Wulfing et al.

[11] Patent Number: 5,812,351
[45] Date of Patent: Sep. 22, 1998

[54] RAISED-REGION HAVING SLOPED EDGES UNDER CLEANING FABRIC IN FLEXIBLE MAGNETIC RECORDING DISKETTE CARTRIDGE COVER SHELL

[75] Inventors: James J. Wulfing, Stillwater; Jon R. Clark, Minneapolis, both of Minn.

[73] Assignee: Imation Corp., Oakdale, Minn.

[21] Appl. No.: 528,685

[22] Filed: Sep. 15, 1995

[51] Int. Cl.⁶ .................................................. G11B 23/033
[52] U.S. Cl. ............................................................ 360/133
[58] Field of Search .............................. 360/133; 369/291

[56] References Cited

U.S. PATENT DOCUMENTS

| | | | |
|---|---|---|---|
| 4,510,546 | 4/1985 | Asami et al. | 360/133 |
| 4,620,247 | 10/1986 | Papciak et al. | 360/133 |
| 4,630,728 | 12/1986 | Matsumoto et al. | 360/133 |
| 4,648,002 | 3/1987 | Mroz et al. | 360/133 |
| 4,654,742 | 3/1987 | Harris et al. | 360/133 |
| 4,677,516 | 6/1987 | Iizuka et al. | 360/133 |
| 4,750,075 | 6/1988 | Oishi | 360/133 |
| 4,843,511 | 6/1989 | Downey | 360/133 |
| 5,029,319 | 7/1991 | Doi | 360/133 |
| 5,081,556 | 1/1992 | Ikebe et al. | 360/133 |
| 5,083,231 | 1/1992 | Veenstra et al. | 360/133 |
| 5,090,010 | 2/1992 | Takahashi | 369/291 |
| 5,282,106 | 1/1994 | Saito et al. | 360/133 |
| 5,359,483 | 10/1994 | Arsenault et al. | 360/133 |
| 5,498,456 | 3/1996 | Ikebe et al. | 360/133 |
| 5,506,740 | 4/1996 | Harmon | 360/133 |

FOREIGN PATENT DOCUMENTS

| | | |
|---|---|---|
| 0 653 756 A2 | 5/1995 | European Pat. Off. . |
| 35 40 560 A1 | 5/1986 | Germany . |
| 60-020374 | 2/1985 | Japan ...................................... 360/133 |
| 63-191386 | 8/1988 | Japan . |
| 5-62415 | 3/1993 | Japan . |

OTHER PUBLICATIONS

Photomicrographs of ribs on the inner surfaces of 3½ micro–floppy diskettes sold by various companies, 7 sheets, prior to Sep. 15, 1995.

Photomicrographs of a "molded–in lifter" on the inner surface of the base shell of a 3½ micro–floppy diskette sold by KAO, 2 sheets, prior to Oct. 16, 1996.

*Primary Examiner*—Craig A. Renner
*Attorney, Agent, or Firm*—Eric D. Levinson

[57] ABSTRACT

A cartridge for a floppy diskette has a cover shell and a back shell. Fabric liners are provided on the interior of the cartridge so that the floppy diskette is cleaned when it rotates. A lifter is provided on the back shell underneath the fabric liner. A raised region is formed on the inner surface of the cover shell under the fabric liner and opposite the lifter on the back shell. The raised region rises from the plane of the cartridge shell beginning at the periphery and rising until a central raised area is reached. The angle of inclination, $\alpha$, is less than 20°. This minimizes the likelihood that the raised region will cause an imprint on the floppy diskette, thereby damaging it, if the cover and back shells of the cartridge are squeezed together.

23 Claims, 4 Drawing Sheets

RAISED-REGION HAVING SLOPED EDGES UNDER CLEANING FABRIC IN FLEXIBLE MAGNETIC RECORDING DISKETTE CARTRIDGE COVER SHELL

FIELD OF THE INVENTION

The present invention relates generally to flexible magnetic recording disc cartridges having a cover shell and a back shell, and more specifically to the structure on the inner surface of the cover shell positioned opposite the lifter on the inner surface of the back shell for lifting a fabric liner in such cartridges to contact and thereby clean the recording disc.

BACKGROUND OF THE INVENTION

Floppy magnetic recording discs are flexible discs of polyester resin or the like having a magnetic layer on each side thereof on which information is recorded by a magnetic head. Floppy discs which have a diameter of 3½ inches (8.9 cm) or less are known as micro-floppy discs. The micro-floppy disc comprises a circular magnetic recording medium which is thin, has a small diameter, and has a hub fixed to the center of the recording medium. Generally, the micro-floppy disc is accommodated in a hard casing to form a cartridge comprising a cover shell and a back shell.

The cartridge generally includes a fabric liner on both inner surfaces of the cartridge shell. The liner is kept in contact with the recording surface of the disc to remove debris on the recording surface while the disc is rotated. The liner has a width at least equal to the width of the recording region of the disc, and is kept pressed against the entire width of the recording surface by a lifter which is secured to the inner surface of the back shell. The lifter is supported upward toward the fabric liner by several ribs that are integral with the inner surface of the back shell. A pattern of several ribs is also provided on the inner surface of the cover shell corresponding to the location of the lifter on the back shell. This pattern of ribs helps to press the fabric liners into contact with the disc, thereby facilitating cleaning of the disc when it is rotated within the cartridge.

SUMMARY OF THE INVENTION

While the pattern of cleaning ribs on the inner surface of the cover shell opposite the lifter aid in the cleaning of the recording medium, prior art ribs have the disadvantage that they may damage the recording medium when the cover and back shells are squeezed together. This may cause a "print-through" of the ribs into the recording medium, i.e., an indentation in the surface of the recording medium corresponding to the pattern of the ribs. If the indentations are too deep, losses due to irregular spacing between the read/write head and the recording medium surface will increase, thereby increasing the error-rate of the drive system.

Applicants have discovered that this type of media damage is caused mainly by sharp corners at the rib ends and by the large amounts of open space between ribs. Typically, the rib ends are perpendicular to the inner surface of the cartridge shell. Even if the end of the rib rises at an angle less than 90° or is rounded, the end of the rib is usually still too steep. Furthermore, the relatively wide gap between ribs increases the likelihood of media damage at the ends or corners of the ribs, i.e., the recording medium tends to drape over or conform to each individual rib, especially when the two cartridge shells are forced together.

There is also the possibility that print-through can be caused by the pattern of ribs provided on the inner surface of the back shell under the lifter. This risk, however, is minimized by the fact that the lifter is positioned between the ribs on the back shell and the recording medium. Thus, the lifter tends to soften the edges of these ribs, thereby minimizing the risk of print-through. However, in the case of the ribs provided on the cover shell opposite the lifter, there is no lifter provided between these ribs and the recording medium. Thus, the risk of print-through is significantly greater for these ribs than it is for the ribs provided on the back shell under the lifter.

The present invention includes a raised region provided on the inner surface of the cover shell opposite the position of the lifter on the back shell which supports the fabric liner of a flexible recording disc, e.g., magnetic floppy diskette, so that the recording disc is cleaned when rotated. The raised region has a peripheral area and raised central area. In the peripheral area, the height of the region rises from the cartridge shell to the height of the central raised area. In at least two edges of the region, the height of the region rises in the peripheral area at an angle, $\alpha$, less than about 30°. The angle, $\alpha$, is more preferably less than about 20°, and is most preferably in the range from about 5° to 13°. The peripheral area may also rise (from the edge of the region to the central raised area) along the circumference of a circle, the circle having a radius of at least about 1 mm, and more preferably in the range from about 3 to 10 mm. The radius may also be greater than 10 mm.

The raised region may include a plurality of parallel ribs, the lengths of which extend from one edge of the region to the opposite edge. There are preferably at least about 5 ribs, more preferably at least about 11 ribs, and most preferably at least about 16 ribs. Neighboring ribs are preferably separated from each other by a distance that is less than twice the width of the ribs. This distance is more preferably less than 1½ times the width of the rib, and is most preferably within the range from 0.8 to 1.2 times the width of the rib.

The raised region may be polygonal, such as rectangular. The central raised area of the raised region may be continuous and planar, and may have a height in the range from about 0.3 to 0.6 mm.

The raised region may be formed from two sets of at least 5 parallel ribs which intersect each other at an angle, $\theta$, between 45° and 135°. The two sets of ribs are preferably approximately perpendicular to each other.

The raised region may have a pattern of holes therein. If the holes are aligned in a rectangular array, the raised region will have a waffle-like appearance. Alternatively, the holes may be aligned in columns and rows which are not perpendicular so that the raised region has a honeycomb-like appearance.

The dimensions of the raised central area are preferably from about 17 mm by 8 mm to about 25 mm by 25 mm, more preferably about 20 mm by 11 mm. Preferably, less than about 50% of the area of the raised area is occupied by holes, spaces, or channels in the raised area (e.g., for ribs), and more preferably this percentage is less than about 25% (e.g., for the waffle and honeycomb arrays). The invention increases the total area of the raised portion of the raised area, thereby decreasing the force per unit area, and thus minimizing the likelihood of print-through.

DETAILED DESCRIPTION

Figure 1:
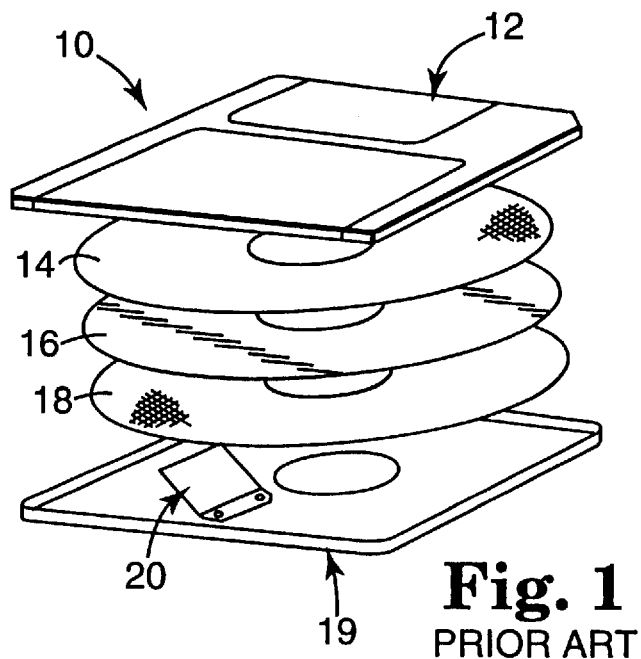
FIG. 1 is an exploded, perspective view of a prior art magnetic recording diskette cartridge.

A prior art micro-floppy magnetic recording disc cartridge 10 is shown in FIG. 1. The cartridge 10 is comprised of a cover shell 12 and a back shell 19 which enclose a floppy magnetic recording disc 16. The cartridge shells 12 and 19 each have a fabric liner 14 and 18, respectively, on their inner surface which approximates the shape of the disc 16. A lifter 20 is affixed to the inner surface of back shell 19 and applies an upward pressure on the fabric liner 18 which causes the fabric to rub against the disc 16, thereby cleaning the disc as it is rotated in the cartridge 10.

Figure 2:
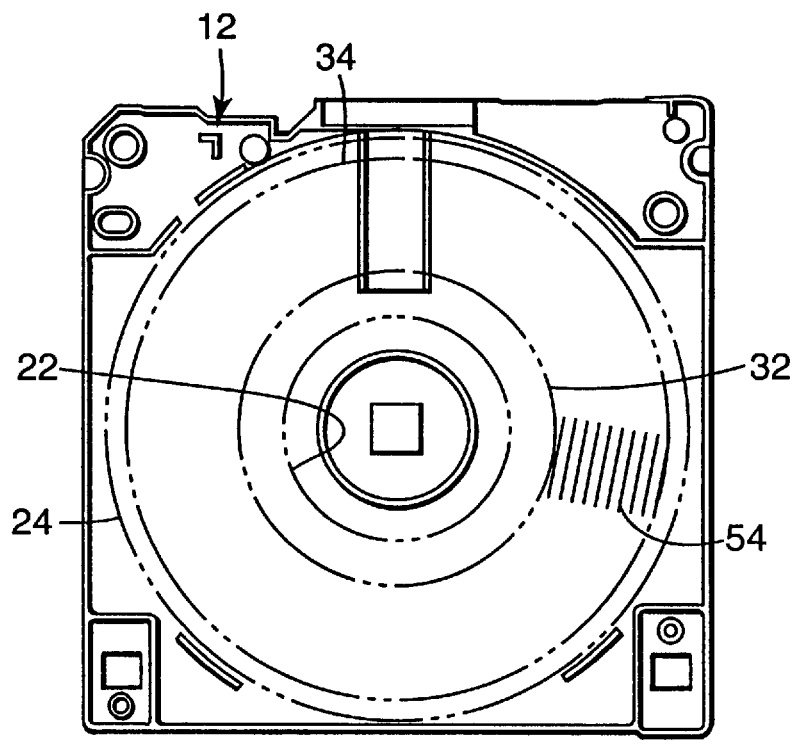
FIG. 2 is an overhead view of the inner surface of the cover shell of the cartridge of FIG. 1.

The inner surface of cover shell 12 is shown in more detail in FIG. 2. Floppy disc 16 has an inner circumferential edge 22 and an outer circumferential edge 24. Floppy disc 16 also has an innermost data track 32 and an outermost data track 34. Commonly, the precise location of the innermost and outermost data tracks on a floppy disc differ on one side of the disc from the other (assuming both sides are recordable). For the purposes of this application, the location of data tracks 32 and 34 represent the average of the two sides of the floppy disc.

Raised ribs 54 are provided on the inner surface of cover shell 12. Ribs 54 span the width of the recording area of floppy disc 16 between data tracks 32 and 34. Ribs 54 are positioned on the inner surface of cover shell 12 so that when back shell 19 is assembled to the cover shell, the ribs will be aligned with lifter 20.

Figure 3:
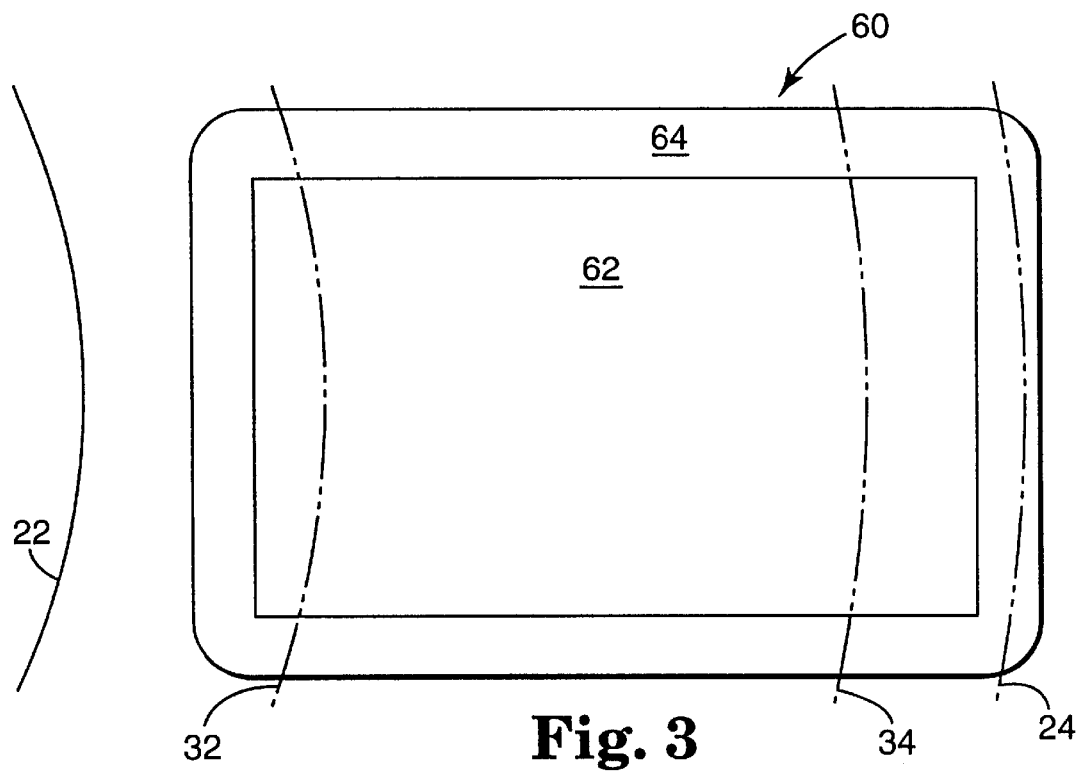
FIG. 3 is an overhead view of a raised region on the inner surface of a diskette cartridge cover shell opposite a lifter according to one embodiment of the present invention.

According to the present invention, ribs 54 in FIG. 2 are replaced by a raised region 60 as shown in FIG. 3. Raised region 60 is shown as being rectangular, but it may also be circular or polygonal, including a square. Raised region 60 has a peripheral portion 64, where the height of the region rises from the inner surface of the cartridge, and a central area 62 at a relatively constant height. The length of raised region 60 spans the width of floppy disc 16 from innermost data track 32 to outermost data track 34. Raised region 60 may be a single, continuous raised area which is integral with the cartridge shell, as shown in FIG. 3.

Figure 4:
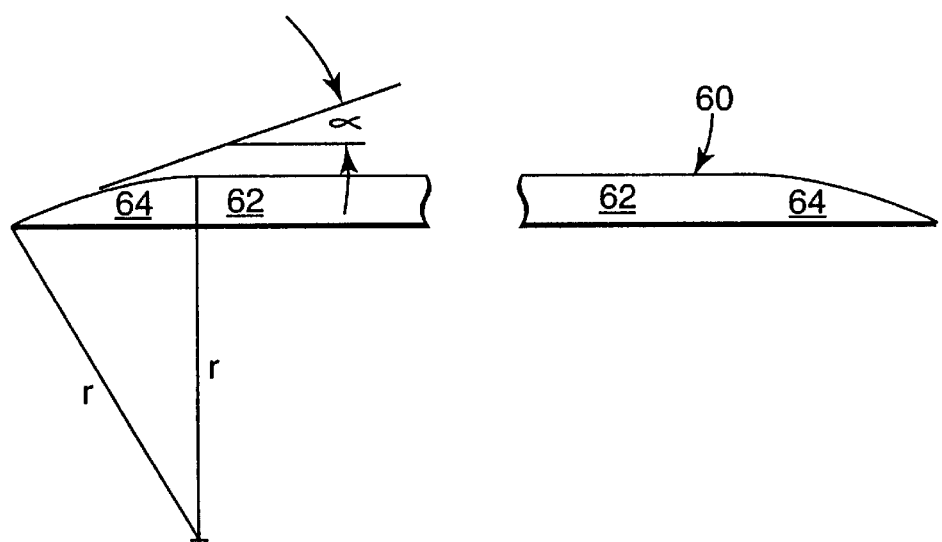
FIG. 4 is a side view of the raised region shown in FIG. 3.

A side view of raised region 60 is shown in FIG. 4. Raised region 60 gradually ramps up in peripheral region 64 to the final height of central area 62. The angle of inclination, α, of raised region 60 in the area of peripheral portion 64 is preferably less than about 30°, more preferably less than about 20°, and is most preferably in the range from 5° to 13°, e.g., 9°. The ramp may also be radiused, having a radius of curvature, r, preferably of at least about 1 mm, and more preferably from about 3 to 10 mm, e.g., 5 mm. The radius of curvature, r, may also be greater than 10 mm. The ramp should be gradual enough to minimize print-through onto the recording medium when the two halves of the cartridge shell are forced together, but the ramp should not be so gradual that the size of the area of central area 62 is compromised. Central area 62 has a height within the range from 0.3 to 0.6 mm, such as about 0.43 mm.

Figure 5:
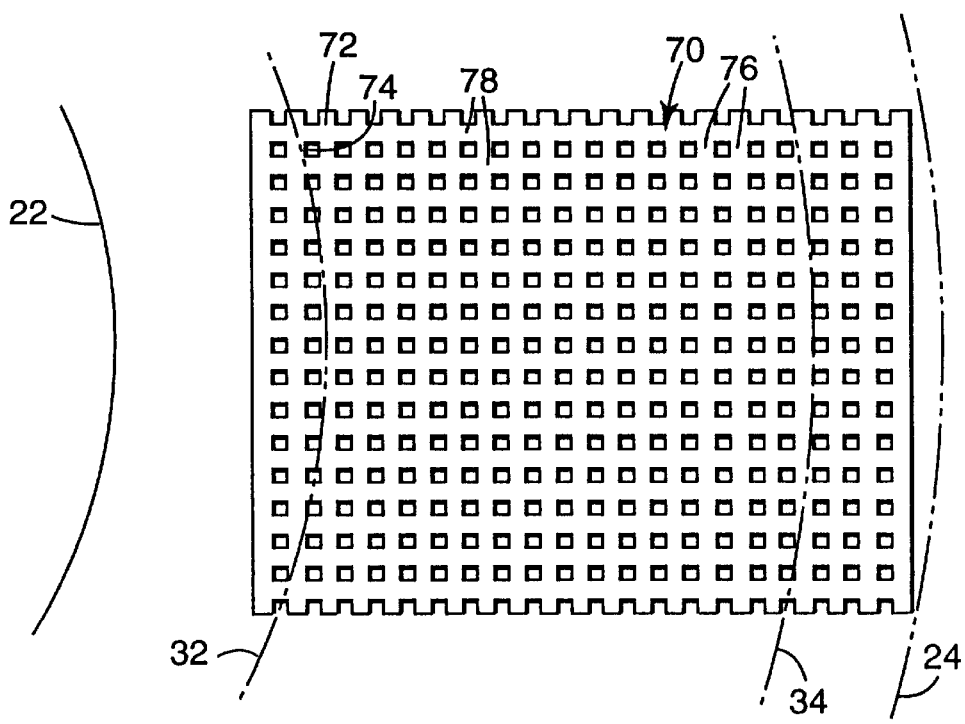
FIG. 5 is an overhead view of a raised region having a waffle-like appearance according to a second embodiment of the present invention.

A second embodiment of a raised region is shown in FIG. 5. Raised region 70 resembles raised region 60 but has a plurality of holes 74 that interrupt the surface 72 of the raised region. Holes 74 are shown as being square, giving raised region 70 a waffle-like appearance, but other shapes may be used.

Raised region 70 may be thought of as parallel ribs in columns 76 intersecting perpendicular ribs in rows 78. There are preferably at least 5 each of the columns and rows of ribs, more preferably at least 10, and most preferably from about 20 to 24, e.g., 21. Column ribs 76 preferably have a period of from about 0.5 to 4.0 mm, more preferably from about 0.5 to 2.0 mm, such as 1 mm. Neighboring column ribs 76 are preferably separated by from about 0.2 to 3 mm, more preferably from about 0.2 to 1.5 mm, such as 0.5 mm. Similarly, row ribs 78 may have a similar period and separation distance.

Figure 6:
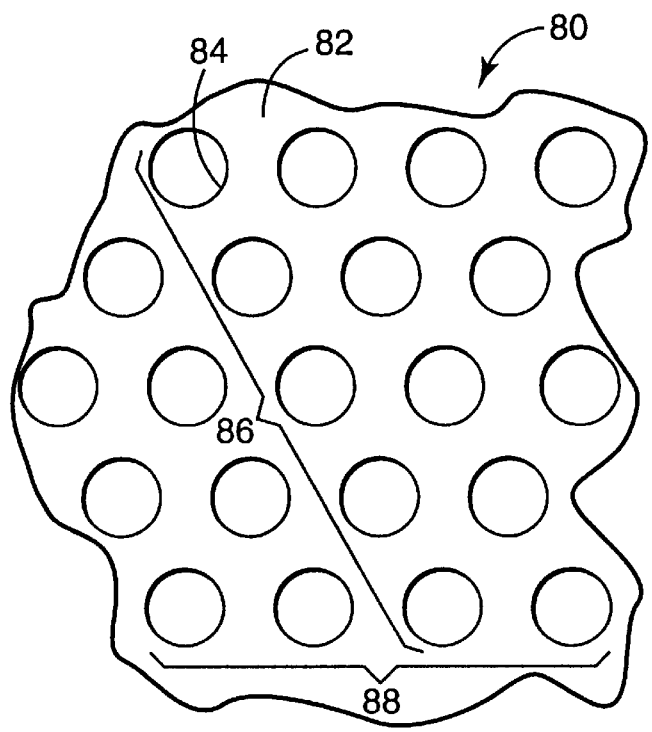
FIG. 6 is an overhead view of a portion of a raised region having a honeycomb-like appearance according to a third embodiment of the present invention.

An alternative type of raised region is shown in FIG. 6. Raised region 80 resembles raised region 70 but has a plurality of holes 84 that interrupt the surface 82 of the raised region. Holes 84 are shown as being circular, but other shapes may be used.

Holes 84 may be thought of as being aligned along columns 86 and rows 88, wherein the columns are not perpendicular to the rows. For example, the angle formed between the columns and rows is preferably between 45° and 75°, such as 60°. The use of sixty degree angles give raised region 80 a honeycomb-like appearance. Each hole 84 preferably has a center-to-center spacing with each of its neighboring holes of from about 0.5 to 3.0 mm, more preferably 0.7 to 2.0 mm, e.g., 1.2 mm. Each hole 84 preferably has a diameter of about ¼ to ⅓ of the center-to-center spacing.

Figure 7:
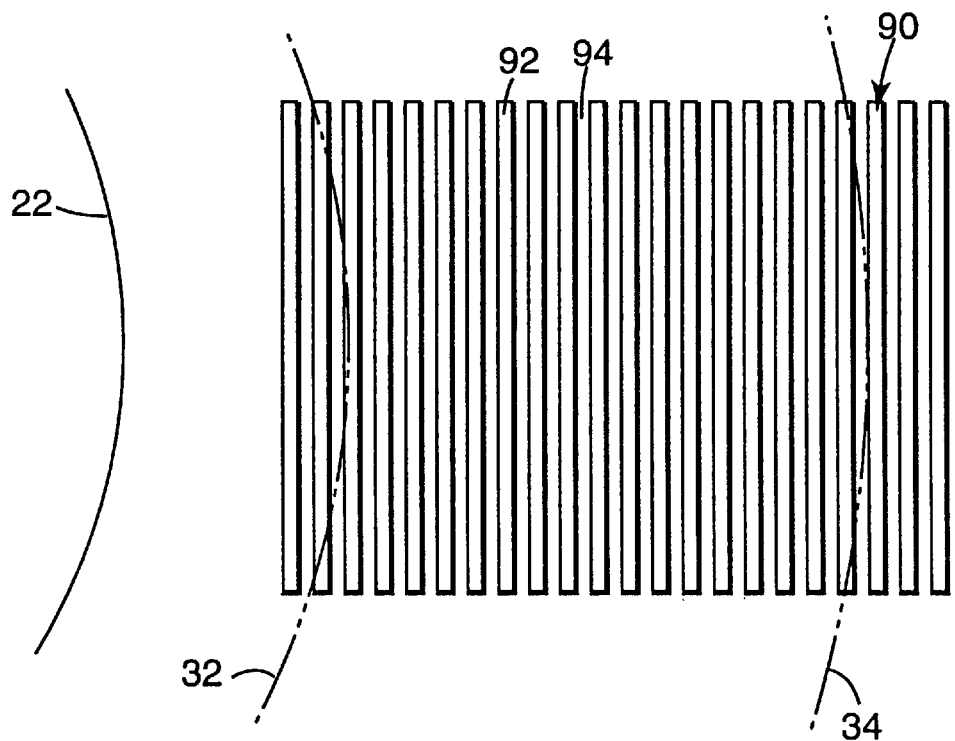
FIG. 7 is an overhead view of a raised region having closely spaced ribs according to a fourth embodiment of the present invention.

Another type of raised region is shown in FIG. 7. Raised region 90 is comprised of several ribs 92 separated by spaces 94. Raised region 90 preferably comprises at least 5 ribs, more preferably at least 11, and may include over 20 ribs, e.g., 21. Ribs 92 preferably have a width within the range from about 0.2 to 2.0 mm, more preferably from about 0.3 to 1.0 mm, such as 0.5 mm. Spaces 94 are preferably less than twice the width of ribs 92, more preferably less than 1½ times the width of the ribs, and most preferably within the range from 0.8 to 1.2 times the width of the ribs.

All of the raised regions preferably have the central plateau portions and peripheral (ramp) portions as discussed with reference to FIGS. 3 and 4. Those skilled in the art will recognize that this invention may have applicability to other data storage media where cleaning of the medium with a fabric is desired and where prior art rib profiles may potentially damage the media by "print-through." While the terms "cover shell" and "back shell" have been used herein, these terms have been chosen solely for the purpose of illustration. The present invention covers the raised region on the inner surface of the shell which does not have the lifter, regardless of whether the lifter is provided on the inner surface of the "cover shell" or the "back shell."

We claim:

1. In a floppy magnetic recording disc cartridge having first and second shells enclosing a flexible magnetic recording disc, the cartridge including fabric liners provided on inner surfaces of the shells so that the disc is cleaned by rotation of the disc with respect to the liners, and wherein a lifter is secured at a first end to the inner surface of the first shell under the fabric liner on the first shell and is inclined with respect to the first shell so that a second opposite end of the lifter supports the liner on the first shell against the disc, the improvement comprising a raised region provided on the inner surface of the second shell, the raised region being positioned opposite the lifter when the first and second shells are assembled together, the raised region having a periphery, at least two opposite edges, and a central raised area, wherein, at said at least two opposite edges of the periphery, the region rises from the inner surface of the second shell to the central raised area of the raised region at an angle, $\alpha$, wherein $5°<\alpha<30°$.

2. The raised region of claim 1, wherein $5°<\alpha<20°$.

3. The raised region of claim 1, wherein $5°<\alpha<13°$.

4. The raised region of claim 1, wherein, at said at least two opposite edges of the periphery, the region has a radius of curvature, r, wherein $1\ mm<r<10\ mm$.

5. The raised region of claim 4, wherein $3\ mm<r<10\ mm$.

6. The raised region of claim 1, wherein the raised area has dimensions of from about 17 mm by 8 mm to about 25 mm by 25 mm.

7. The raised region of claim 1, wherein the raised region is comprised of at least 5 parallel ribs, wherein the length of the ribs extends from one of said at least two edges to the other of said at least two edges.

8. The raised region of claim 7, wherein there are at least 16 ribs.

9. The raised region of claim 7, wherein neighboring ribs are separated by a distance, d, which is less than twice the width, w, of the ribs.

10. The raised region of claim 9, wherein $d<1.5\ w$.

11. The raised region of claim 9, wherein $0.8\ w<d<1.2\ w$.

12. The raised region of claim 1, wherein the raised region is a polygon.

13. The raised region of claim 12, wherein the polygon is a rectangle.

14. The raised region of claim 13, wherein the central raised area is continuous and planar.

15. The raised region of claim 13, wherein the raised region comprises a first plurality of at least 5 ribs, the lengths of which extend from one of said at least two edges to the other of said at least two edges, and a second plurality of at least 5 ribs, wherein the lengths of the first and second pluralities of ribs are oriented at an angle, $\theta$, between $45°$ and $135°$ with respect to each other.

16. The raised region of claim 15, wherein the two pluralities of ribs are approximately perpendicular to each other.

17. The raised region of claim 12, wherein the central raised area has a plurality of holes formed in the surface thereof.

18. The raised region of claim 17, wherein the holes are uniformly distributed throughout the central raised area.

19. The raised region of claim 18, wherein the holes are aligned in a rectangular array, so that the central raised area has a waffle-like appearance.

20. The raised region of claim 18, wherein the holes are aligned in an array having columns which are not perpendicular to rows, so that the central raised area has a honeycomb-like appearance.

21. The raised region of claim 1, wherein the central raised area has a height within the range from 0.3 to 0.6 mm.

22. The raised region of claim 1, wherein holes, spaces, and channels account for less than 50% of the total area of the raised area.

23. The raised region of claim 1, wherein holes, spaces, and channels account for less than 25% of the total area of the raised area.

* * * * *